US012791178B2

(12) United States Patent
Kohler et al.

(10) Patent No.: US 12,791,178 B2
(45) Date of Patent: Nov. 10, 2026

(54) CONNECTION PLUG FOR LUMINAIRE MOUNTING RAIL SYSTEM

(71) Applicant: ZUMTOBEL LIGHTING GMBH, Dornbirn (AT)

(72) Inventors: Christian Kohler, Dornbirn (AT); Wolfgang Bechter, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 18/688,930

(22) PCT Filed: Sep. 8, 2023

(86) PCT No.: PCT/EP2023/074786

§ 371 (c)(1),
(2) Date: Mar. 4, 2024

(87) PCT Pub. No.: WO2024/056553

PCT Pub. Date: Mar. 21, 2024

(65) Prior Publication Data

US 2025/0244003 A1 Jul. 31, 2025

(30) Foreign Application Priority Data

Sep. 13, 2022 (DE) ......................... 102022123241.7

(51) Int. Cl.
*F21V 23/06* (2006.01)
*F21V 21/35* (2006.01)
(Continued)

(52) U.S. Cl.
CPC .............. *F21V 23/06* (2013.01); *F21V 21/35* (2013.01); *H01R 25/162* (2013.01); *H01R 31/005* (2013.01); *F21V 23/002* (2013.01)

(58) Field of Classification Search
CPC ........ F21V 23/06; F21V 21/35; F21V 23/002; H01R 25/162; H01R 31/005; H01R 11/32; H01R 31/06; H01R 25/14
See application file for complete search history.

(56) References Cited

U.S. PATENT DOCUMENTS 6,575,777 B2 * 6/2003 Henriott ............... H01R 25/162 439/654
2003/0021111 A1 1/2003 Miller
2022/0364713 A1 * 11/2022 Ladstätter ............ H01R 9/2608

FOREIGN PATENT DOCUMENTS

DE 2114911 A1 9/1972
EP 3477791 A1 5/2019
(Continued)

OTHER PUBLICATIONS

PCT/EP2023/074786, International Search Report, Dec. 15, 2023, 4 pages.

*Primary Examiner* — Seung H Lee
(74) *Attorney, Agent, or Firm* — Andrus Intellectual Property Law, LLP

(57) ABSTRACT

A connection plug (5) for a luminaire mounting rail system (1) has two carriers (51, 52) connected to one another via an intermediate spring element (50) in order to prestress the two carriers (51, 52) away from one another during a collapsing movement (K). Multiple contact elements (54) each have a plug connector element (55) for the electrical connection to an electrical conductor (30) of a busbar (3) of the luminaire mounting rail system (1), and a cable portion (56) which is electrically connected to the plug connector element (55). At least a portion of the plurality of contact elements (54) is carried by at least one of the carriers (51, 52).

28 Claims, 6 Drawing Sheets

(51) Int. Cl.

| | |
|---|---|
| ***H01R 25/16*** | (2006.01) |
| ***H01R 31/00*** | (2006.01) |
| *F21V 23/00* | (2015.01) |

(56) References Cited

FOREIGN PATENT DOCUMENTS

| | | | |
|---|---|---|---|
| EP | 3767758 | A1 | 1/2021 |
| WO | 2021069296 | A1 | 4/2021 |

* cited by examiner

CONNECTION PLUG FOR LUMINAIRE MOUNTING RAIL SYSTEM

CROSS-REFERENCE TO RELATED APPLICATION

The present application is the U.S. national stage application of international application PCT/EP2023/074786 filed Sep. 8, 2023. The international application claims priority to German Patent Application No. 10 2022 123 241.7, filed Sep. 13, 2022.

TECHNICAL FIELD OF THE INVENTION

The present invention relates to a connection plug for a luminaire mounting rail system and to a luminaire mounting rail system equipped therewith.

BACKGROUND OF THE INVENTION

Elongated luminaire mounting rail systems are generally known. For example, such a luminaire mounting rail system is offered by the applicant under the designation TECTON. Such luminaire mounting rail systems generally comprise elongated profile rail elements which can be assembled longitudinally in series with an overall system of any length. The individual profile rail elements thereby generally form or surround a common elongated interior space. In the interior, one or more busbars extend longitudinally. Electrical or electronic components can be mounted on the profile rail elements—preferably at any point along the longitudinal extension of the luminaire mounting rail system—in such a way that they can be electrically coupled to the busbar and can thus be connected to the power supply and/or data network provided via the busbar and operated. In order to mechanically connect the individual profile rail elements to one another, connectors may be used which generally extend in the interior space over in each case adjacent profile rail elements and are mechanically connectable thereto in such a way that the profile rail elements are fixed in position relative to one another. Special profile rail modules in which a corresponding electrical coupling is provided are often offered for feed-in into or for feed-out from the luminaire mounting rail system. These are often made individually, depending on the position and type of the coupling and number of poles, which requires a high manufacturing effort. In addition, complex wiring in a particularly narrow space is required. Furthermore, it is known to provide connection options at end-side ends of the busbars, which options enable a connection option for an overhung conductor for the electrical connection thereof for each electrical conductor of the busbar. The connection of the overhung conductors also takes place here—delimited by the interior space of the busbar—in a particularly narrow space, which makes for a complicated assembly process.

It is now an object of the present invention to provide a simple, flexible and diverse option for the electrical connection of a busbar of a luminaire mounting rail system.

This object is achieved by the subject matter of the independent claims. The dependent claims develop the central idea of the present invention in a particularly advantageous manner.

According to a first aspect, the present invention relates to a connection plug for a luminaire mounting rail system, thus for insertion into such a luminaire mounting rail system or into a profile rail element of the luminaire mounting rail system. The connection plug has at least two carriers—i.e., a first carrier and a second carrier—which are connected to one another via an intermediate spring element in order to prestress the two carriers away from one another (i.e., thrusting the carriers away from one another counter to the collapsing movement) during a collapsing movement toward one another (i.e., a movement directed toward one another for bringing the carriers closer together). The connection plug furthermore has a plurality of contact elements. The contact elements in turn comprise a plug connector element for the electrical connection to an (associated) electrical conductor of a busbar of the luminaire mounting rail system. The contact elements also each comprise a cable portion which is electrically connected to the plug connector element. At least a portion of the plurality of contact elements is carried by at least one of the carriers. Therefore, all contact elements can thus be carried by one of the two carriers. It is also conceivable that a portion of the plurality of contact elements is carried by one of the carriers, and another portion of the plurality of contact elements is carried by the other carrier (and/or by further carriers to be described). The plug connector elements all extend in parallel to the same longitudinal axis away from one side of the carrier that carries them. The cable portions in turn extend away from the carrier that carries them and toward a distal end of the corresponding cable portion. The distal ends each comprise an electrical connection portion for the electrical connection to a further electrical conductor; this applies in particular for the electrical connection of the associated electrical conductor to the corresponding further electrical conductor.

By means of the connection plug described above, it is thus possible in a particularly simple manner to insert the connection plug into a profile rail element of a luminaire mounting rail and then to electrically connect each of the contact elements—preferably simultaneously—to an electrical conductor of a busbar of a luminaire mounting rail system and thus to provide it on a corresponding cable portion. Because the carriers are furthermore connected via the spring element, they can be brought together in a defined manner into a collapsed position in order to thus preferably also insert the connection plug into a narrow profile rail element. Because the spring element pushes the carriers apart again in the collapsed position, the connection plug is thrusted into its operating position after insertion into the profile rail element or in the direction thereof, so that the carriers may preferably each be (automatically) aligned with the associated busbars, which further simplifies assembly and reduces the risk of incorrect installation. Because the plug connector elements are also all aligned in parallel to one another, they can be electrically connected to the busbar in a single plug-in direction and thus in a single plug-in movement. The corresponding cable portions extend accordingly away from the corresponding carrier and thus from the connection plug and are thus easily to reach for the connection of further (external) electrical conductors in order to establish an electrical connection via these cable portions to the corresponding electrical conductors of the busbar. For example, an overhung connection option for each electrical conductor can thus be created, so that the flexibility of the luminaire mounting rail system is maintained overall, whereas a corresponding electrical connection option for a particularly simple electrical feed-in or feed-out may be integrated into a luminaire mounting rail system by means of the connection plug. Despite limited space available within the corresponding luminaire mounting rail systems or the profile rail elements thereof, a simple handling and ideally a connection (for example external conductor) outside the profile rail element can be enabled with clearly improved visibility.

The connection plug may further comprise at least one third carrier, which is preferably arranged laterally offset from the first carrier and the second carrier in a direction orthogonal to the longitudinal axis and the collapsing movement. In this way, a further positioning or support option can be created with the third carrier in order to thus arrange the connection plug in a particularly secure and preferably securely positioned manner in a profile rail element of a luminaire mounting rail system.

Preferably, at least one other portion of the contact elements can be carried by the third carrier. In this way, the variability of the connection plug may be extended. A connection to busbars is thus possible (also) independently of the collapsing movement of the first and second carriers.

According to a further aspect, the present invention further relates to a connection plug for a luminaire mounting rail system, thus for insertion into such a luminaire mounting rail system or into a profile rail element of the luminaire mounting rail system. The connection plug also has at least two carriers—i.e., a first carrier and a second carrier—which are connected to one another via an intermediate spring element in order to prestress the two carriers away from one another (i.e., thrusting the carriers away from one another counter to the collapsing movement) during a collapsing movement toward one another (i.e., a movement directed toward one another for bringing the carriers closer together). The connection plug also has a plurality of contact elements, each of which, on the one hand, has a plug connector element for the electrical connection to an electrical conductor of a busbar of the luminaire mounting rail system and, on the other hand, a cable portion which is electrically connected to the plug connection element. In addition, the connection plug has a third carrier, which is arranged laterally offset from the first carrier and the second carrier in a direction orthogonal to the longitudinal axis and the collapsing movement. At least a portion of the contact elements is carried by the third carrier in this connection plug. The plug connector elements all extend in parallel to the same longitudinal axis from one side of the carrier that carries them—thus in this case at least from the third carrier. The cable portions in turn all extend away from the carrier that carries them—thus in this case at least from the third carrier—to a distal end of the corresponding cable portion. The distal ends in turn each comprise an electrical connection portion for the electrical connection to a further electrical conductor for the electrical connection of the associated electrical conductor to the corresponding further electrical conductor.

The above-described connection plug basically results in the same advantages as with the above-described connection plug according to the first aspect of the invention. This can thus also be inserted through the two carriers (first carrier and second carrier) in a simple manner into a corresponding profile rail element and may preferably be positioned in a defined manner therein. The corresponding contact elements can thus be provided at least via the third carrier at the correspondingly defined position in order to electrically contact corresponding electrical conductors of a busbar of a luminaire mounting rail system via a simple plug-in movement. Via the (overhung) cable portions, a connection, for example of external conductors, can thus be enabled in a simple manner.

Another portion of the plurality of contact elements may preferably be carried at least by the first carrier or the second carrier. In this way, the functionality of the connection plug may be expanded and thus makes it possible to also electrically contact a plurality of busbars of a luminaire mounting rail system using one connection plug and accordingly in one plug-in process with the connection plug.

The third carrier may preferably be directly connected to the first carrier or to the second carrier or to the first and second carriers. In this context, a "direct" connection is understood to mean a direct physical connection between the described components without one of the other components mentioned being located therebetween. In this way, the connection plug can easily be produced and provided in a stable manner. In addition, a particularly compact design of the connection plug can thus preferably be provided.

The third carrier may be designed such that, when the first and second carriers are brought together in the collapsing movement, it collapses in the direction of the collapsing movement. This can be enabled in different ways. For example, the third carrier can be connected to the first carrier and the second carrier and, due to the combining of the first and second carriers, can fold down or be folded together via a hinge portion (for example a film hinge or portion of reduced material thickness) formed in the third carrier or a corresponding hinge element, in order then to be ready in an operating configuration in the installed state of the connection plug with first and second carriers that are again guided away from one another. In principle, it is also conceivable that the third carrier is provided only on one of the above-described carriers, or independently thereof, and has a corresponding flipping or folding function. The third carrier can also be pushed together, and thus be collapsed when required, for example by telescopically connected elements along the collapsing movement direction. This makes it possible to reduce the width of the connection plug overall and also in the presence of a third carrier if necessary in order to be able thus to insert this in a simple manner into the interior space of a profile rail element of a luminaire mounting rail system, for example. Due to the spring preload of the spring element by bringing the first and second carriers together, the connection plug is then thrusted back into its original position after insertion, so that the connection plug—and with it also the third carrier—is automatically extended and ready for operation.

The first carrier and the second carrier preferably each carry a different portion of the plurality of contact elements. Therefore, the contact elements are thus divided at least onto the two carriers and preferably onto all three carriers, if present, so that each carrier has corresponding contact elements in order to be able to be electrically contacted in each case with a busbar of a correspondingly equipped luminaire mounting rail system. In this way, the connection plug can be contacted in a particularly simple and rapid manner and safely, even when there is a plurality of busbars.

The first carrier and the second carrier and, if present, also the third carrier are preferably aligned in parallel to the longitudinal axis. On the one hand, the connection plug can thus be brought together as compactly as possible in the collapsing movement, so that a simple insertion into a profile rail element is made possible. Furthermore, the carriers can thus be reliably introduced into known luminaire mounting rail systems. In spite of a small installation space, a generous provision of contact elements according to the layout of corresponding busbars can also be provided in this way.

The first carrier and/or the second carrier, and, if present, also the third carrier may preferably be designed to extend substantially in a corresponding extension plane. The carriers can thus be provided as compactly as possible but functionally effectively.

The extension planes of the first carrier and of the second carrier are preferably aligned in parallel to the longitudinal axis. With respect to the collapsing movement, these carriers can thus collapse as effectively as possible, so that the connection plug may be inserted into a profile rail element.

The extension planes of the first carrier and of the second carrier are preferably aligned in parallel to one another. In this way, the first carrier and the second carrier can be maximally collapsed or brought together via the spring element in the collapsing movement direction, enabling a particularly simple insertion of the connection plug into the profile rail element. In addition, the connection plug can thus be used in a particularly intuitive manner.

The extension plane of the first carrier or of the second carrier is particularly preferably aligned orthogonally to the extension plane of the third carrier. In this way, the carriers can be inserted particularly effectively with respect to known luminaire mounting rail systems, which usually comprise opposite side walls (e.g., side wall legs) and a rear wall (e.g. transverse wall leg) connecting them.

The first carrier and the second carrier and, if present, also the third carrier may preferably be formed integrally with one another. Both handling and production of the corresponding carriers and thus of the connection plug are thus particularly simple overall.

The first carrier and the second carrier and, if present, also the third carrier are preferably made of an insulating material, such as preferably a plastics material. The carriers can thus be produced in a simple manner, for example in an injection molding process. In addition, the carriers thus also have an insulating effect, so that particularly safe handling is possible and any additional insulating measures—in particular for insulating the contact elements—can ideally be avoided.

The plug connector elements for each carrier may preferably be arranged next to one another in a row, this preferably being in or in parallel to the corresponding extension plane of the carrier associated therewith. This allows for a particularly flat design of the carrier and thus preferably also of the connection plug. In addition, the plug connector elements may thus preferably be provided according to the layout of known busbars, so that the connection plug can be integrated in known systems in a simple manner as a retrofit component.

The plug connector elements may preferably each be designed as a plug connector contact (for example as a plug pin) or as a plug receptacle, depending on the desired configuration of the corresponding counterpart on the busbar.

The first carrier and the second carrier may preferably lie opposite one another with respect to the spring element and particularly preferably face one another in a planar manner. In this way, a maximum spring preload of the spring element when the first and second carriers are brought together can be enabled during the collapsing movement, thus allowing for an intuitive and effective installation of the connection plug.

The first carrier and the second carrier may preferably be formed integrally with the spring element. The connection plug can thus be produced and mounted in a particularly simple and cost-effective manner. Alternatively, however, it is also conceivable for the spring element to be arranged as a separate component between the first carrier and the second carrier. The spring element may be designed, for example, as a compression spring. According to the alternative mentioned second, a simple known compression spring, such as a metal coil spring, can be used, for example. In this way, simple, known and already existing/stock standard components can be used, which can sometimes have a positive influence on the production costs with an effective spring effect. In principle, a combination of an integral and separate spring element is also conceivable.

The longitudinal axis may preferably be oriented orthogonally to the collapsing movement. In this way, an effective insertion of the connection plug into the profile rail element can be enabled, which connection plug, which is pushed together in the collapsing movement and is inserted, is thrusted apart and thrusted in the direction of or counter to the direction of the profile rail element into its operating position, and may then be contacted electrically with a corresponding busbar transversely to the collapsing movement along the longitudinal axis. An effective and intuitive contacting process can thus be enabled.

At least each of the carriers carrying the contact elements may preferably comprise one or more conductor receiving portions running in parallel to the longitudinal axis, in each of which one or more of the associated contact elements are partially accommodated in order to be correspondingly carried by the particular carrier. The conductor receiving portions may, for example, be fluted or groove-shaped recesses into which the contact elements are laterally inserted accordingly. It is also conceivable for the conductor receiving portions to be elongated passage openings into which the contact elements are either inserted or, for example, also pressed in. For this purpose, the carrier may, for example, be designed in multiple parts so that the conductor receiving portions are closed around the corresponding portions of the contact elements when the plurality of parts of the carrier are brought together in order to carry them accordingly. Other embodiments of the conductor receiving portions are also conceivable.

The cable portions may preferably all extend away from a further side of the corresponding carrier. The cable portions are thus also provided on a (single) defined side, so that the connection plug can be designed to be, overall, compact and functionally effective. Preferably, the side (i.e., the side away from which the plug connector elements extend) and the further side (i.e., the side away from which the cable portions extend) are preferably opposite one another with respect to the associated carrier. The connection plug can thus be designed to be particularly compact. In addition, an intuitive installation of the plug can thereby be promoted. Because the cable portions thus extend maximally away from the plug connector elements, their accessibility is particularly generous, so that a simple connection of an external wiring, for example, can be easily enabled.

The cable portions may preferably each be designed to be bendable (for example elastically and/or plastically) in such a way that the associated connection portion thereof may be moved or displaced relative to the associated carrier by bending the corresponding cable portion. An "overhung" connection option can thus be created in a particularly simple manner, so that a particularly flexible and easily accessible connection option can be provided. The risk of incorrect assignment can be effectively reduced by the better visibility thus enabled at the time of the connection.

The contact elements and preferably their cable portions may preferably each comprise an electrical line having an electrical conductor element. The electrical conducting elements are consequently surrounded by an insulating sheath. The cable portions can thus be provided using conventional components. The electrical line may preferably be a flexible electrical line or a rigid electrical line. For example, the flexibility thereof can thus also be designed differently. While rigid electrical lines usually remain in the bent position when bent, this is usually not the case with flexible electrical lines. On the other hand, flexible electrical lines can usually be bent more easily.

The electrical conductor elements may preferably each comprise one litz wire; this is preferably done to form a flexible electrical line. Alternatively, it is also conceivable that the electrical conducting elements each comprise one wire, the purpose of which is preferably to form a rigid electrical line. The electrical lines may thus be designed accordingly depending on requirements.

The corresponding plug connector element may preferably be electrically and mechanically connected to the electrical conductor element of the associated electrical line; this is preferably realized by means of crimping, soldering and/or pressing. A simple connection between the plug connector element and the cable portion can thus be provided.

Alternatively, it is also conceivable for the corresponding plug connection element to be integrally formed by an exposed end of one of the electrical conductor elements; this is preferably realized by ultrasound-compacted litz wires of the bundle or by the rigid wire. In this way, separate elements for a plug connection element on the one hand and a cable portion on the other hand can be dispensed with, which reduces both the manufacturing costs and the assembly effort.

The connection plug may preferably also comprise at least one connection terminal which is electrically and preferably also mechanically connected to at least one of the electrical connection portions. The connection terminal may then preferably comprise an electrical contacting portion electrically connected thereto for the electrical connection of the further electrical conductor, depending on the connected electrical connection portion. In this way, a particularly simple connection option for each connection portion can be provided. By providing corresponding connection terminals, they may preferably be provided via the cable portions as "overhung" terminals and may thus preferably be easily moved, if required, to outside of a profile rail element receiving the connection plug in order to be ready there for connecting any further (for example external) electrical conductors, and then be positioned back in the profile rail element. Thus, the installation can be provided particularly simply. Corresponding connection terminals can furthermore be provided in a simple manner with contacting points, such as a defined assignment of the respective poles. In this way, the risk of incorrect assembly can be further reduced.

The connection plug may preferably also comprise a plurality of the connection terminals. In this way, the connection plug may be equipped with any number of connection terminals or connection options of corresponding type, which further increases the flexibility of the connection plug.

The connection terminal or at least one of the connection terminals may preferably be connected to a plurality of the contact elements via their electrical connection portions. In this way, it is possible to combine defined electrical groups in a corresponding connection terminal and thus also to provide them physically and easily recognizable to the operator. The ("overhung") connection terminals may thus be combined as cable groups in order to provide, for example, a terminal for a standard 5-pole connection cable and the like.

According to a further aspect, the present invention further relates to a luminaire mounting rail system. This has an elongated profile rail element with a longitudinal extension. The profile rail element in turn delimits an interior space and also has an elongated coupling opening which preferably extends completely along one side of the profile rail element. The profile rail element thus preferably has an annular shape or a U-shaped profile, which is slotted through the coupling opening, viewed along a cross section in the direction of the longitudinal extension. The luminaire mounting rail system furthermore has an elongated busbar which is arranged in the interior space so as to extend longitudinally. The busbar in turn has electrical conductors extending longitudinally in parallel to one another for the electrical connection of electrical or electronic components via the coupling opening. The luminaire mounting rail system also has a connection element which is arranged in the interior space. For this purpose, the connection element has a further plug connector element for each electrical conductor of the busbar, which element is electrically connected or connectable to the associated electrical conductor. Furthermore, the luminaire mounting rail system has a connection plug according to the present invention, as has also been described above. The connection plug is inserted or insertable in the interior space (and preferably may also be removed again). In the state inserted in this way, the plug connector elements are each electrically contacted or contactable with one of the further plug connector elements by a plug-in movement along the longitudinal axis. The connection plug is thereby thrusted, at least in the state inserted in this way, and/or in the thus electrically contacted state, with its first and second carriers by means of the spring element counter to the collapsing movement in the direction or counter to the direction of the wall portions of the profile rail element that are opposite the coupling opening.

A luminaire mounting rail system may thus be equipped with the connection plug described above in order thus to transmit the advantages of the connection plug, as described above, to a corresponding luminaire mounting rail system. Due to its collapse property, the connection plug can be inserted particularly easily into the interior space of the profile rail element if required. By means of the spring element, the connection plug inserted in this way is then preferably thrusted with its two carriers into its operating position—i.e., in the direction of or counter to the direction of the inner wall of the profile rail element—in order thus to be at best automatically positioned in a defined manner with respect to the busbar(s). The connection plug can also preferably reach at least partially behind projections of the profile rail element in the inserted state and in the operating position in order thus to be held securely in the interior space of the profile rail element. The connection plug inserted in this way can then be connected particularly easily to the busbar(s) by a single plug-in movement. In this case, the connection plug is preferably (also) thrusted with its carriers in the electrically contacted state in the direction of or counter to the direction of the inner wall of the profile rail element in order thus to ensure secure positioning in the contacted state. Overall, an electrical connection can thus be provided for feed-in or feed-out of a luminaire mounting rail system in a particularly simple manner. For this purpose, the connection portions offer a simple connection option of any further (external) electrical conductors. A connection within the luminaire mounting rail system, for example between two busbars arranged longitudinally therein and spaced apart longitudinally, can thus also be easily enabled.

The profile rail element may preferably comprise two side wall legs aligned substantially in parallel to one another which laterally delimit the coupling opening. The side wall legs can each comprise one of the opposing wall portions. The profile rail element can thus be provided easily. In particular, previously known profile rail elements can thus be inserted, so that the connection plug may preferably also be integrated in existing systems in a simple manner as an accessory part.

The profile rail element can furthermore comprise a transverse wall leg connecting the side wall legs, which transverse wall leg preferably lies opposite the interior space of the coupling opening. A particularly stable profile rail element can thus be provided, the interior space of which is securely delimited on the outside.

If present, the third carrier may preferably be arranged facing the transverse wall leg and particularly preferably rest against it; this is the case in particular when the connection plug is installed correspondingly and is electrically contacted with the corresponding busbar.

The luminaire mounting rail system may furthermore comprise a plurality of the busbars and a plurality of the connection elements. Each connection element is preferably associated with precisely one busbar. In this way, contacting options of the luminaire mounting rail system can be extended as desired. Different contacts or contact groups can thus also be distributed to different regions of the luminaire mounting rail system. The luminaire mounting rail system can thus be designed to be particularly compact with high functionality.

Preferably, each of the carriers can be electrically contacted or contactable by its contact elements with another one of the connection elements via their plug connector elements and further plug connector elements. The carriers can thus in each case be assigned functionally only to one busbar, enabling a clear functional separation, and thus an installation which is as error-free as possible with clear assignment.

The busbar or, if present, the plurality of busbars may preferably each be arranged on an inner wall of the profile rail element (i.e., preferably of the side wall legs and/or of the transverse wall leg). On the one hand, the busbars can thus be securely positioned and carried. On the other hand, the accessible region of the interior space can thus be maximized as much as possible in order thus to easily connect any electrical or electronic components or also corresponding wiring during assembly.

The luminaire mounting rail system may preferably further comprise a plurality of the elongated profile rail elements which are connected to one another at the end face, so that their interiors form a common system interior. The profile rail elements can thereby be arranged so as to extend longitudinally from one another in order to enable, for example, a continuous straight lighting strip. The profile rail elements may also be arranged at any angles relative to one another or extend away from one another. A plurality of profile rail elements may also converge in a connection region in order thus to form a luminaire mounting rail system of any design or branch configuration.

The longitudinal extension of the elongated profile rail element may extend in any manner, for example, straight, wave-shaped, zigzag, or in any other way.

At least two of the plurality of profile rail elements that are adjacent may preferably each comprise at least one of the busbars with connection elements facing one another. In this case, each of the connection elements may preferably be electrically contacted or contactable with one of the connection plugs via the plug connector elements and further plug connector elements thereof. Furthermore, the connection portions of one of the connection plugs may preferably be electrically contacted or contactable with the connection portions of the other one of the connection plugs, preferably via their connection terminals in order to electrically connect the busbars of the adjacent profile rail elements to one another in this way. The connection portions or the connection terminals may be designed in such a way that they can be easily plugged together, for example as a plug-socket contacting connection. It is also conceivable that, for example, the connection terminals of the two connection portions to be connected are electrically connected to one another by means of separate wiring. Other electrical connection options are also conceivable here. In this way, a plurality of busbar portions of a contiguous luminaire mounting rail system may be electrically connected to one another in a simple manner. This is advantageous in particular if the profile rail elements extend obliquely away from one another at an angle to one another. In these angled regions, an electrical connection can thus be enabled in a simple manner by means of the connection plug.

The plug connector elements may preferably each be designed as a plug connector contact or as a plug receptacle. Likewise, the further plug connector elements may then each be designed as a plug receptacle or plug connector contact corresponding to the plug connector elements by means of a plug connection for electrical contacting. In this way, the connection plug may be connected in a highly effective and simple manner and particularly securely.

The luminaire mounting rail system may further comprise an electrical or electronic component. This in turn has a functional portion and a connection portion electrically connected to the functional portion for the electrical connection to the busbar via the coupling opening. A luminaire mounting rail system that can be equipped as desired may thus be provided. The functional portion may, for example, comprise a luminaire, a sensor, and/or a loudspeaker and the like.

BRIEF DESCRIPTION OF THE DRAWINGS

Further advantages and embodiments of the present invention are described with reference to the figures of the accompanying drawings. In the figures.

DETAILED DESCRIPTION OF THE EMBODIMENT

The figures show different exemplary embodiments of a luminaire mounting rail system 1 according to the present invention. The luminaire mounting rail system 1 according to the invention has, among other things, a connection plug 5 which forms an independent component of the present invention (see in particular FIG. 3 to 6) and is described below.

FIG. 2 to 6 show the connection plug 5, as can be used, for example, as an accessory part for the luminaire mounting rail system 1 shown here.

As shown in the figures (see in particular FIG. 1 to 6), the connection plug 5 has a first carrier 51 and a second carrier 52.

Figure 2:
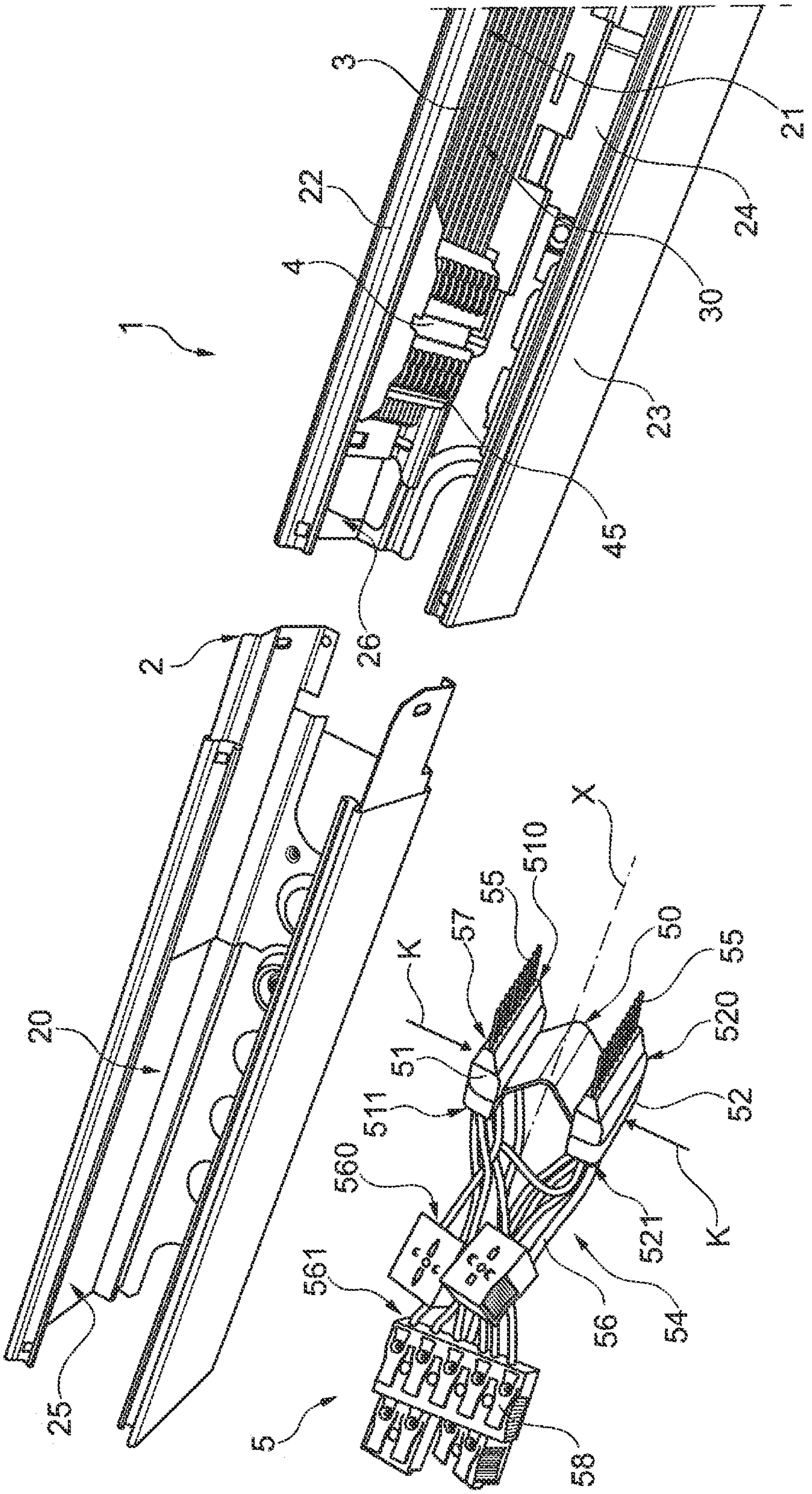
FIG. 2 is a perspective view of the luminaire mounting rail system according to the invention having a connection plug according to FIG. 1 in a partially disassembled state.
Figure 4:
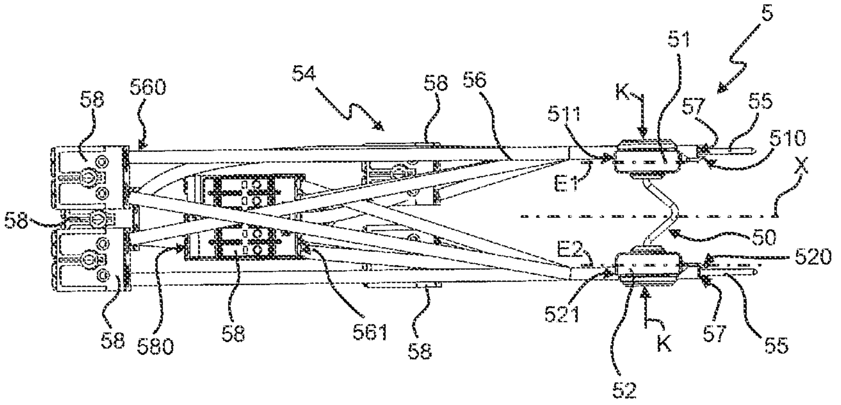
FIG. 4 is a plan view of the connection plug according to the invention according to FIG. 3 as seen in the direction IV.
Figure 5:
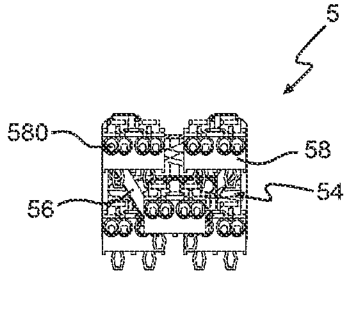
FIG. 5 is a front view of the connection plug according to the invention according to FIG. 3 as seen in the direction V.
Figure 6:
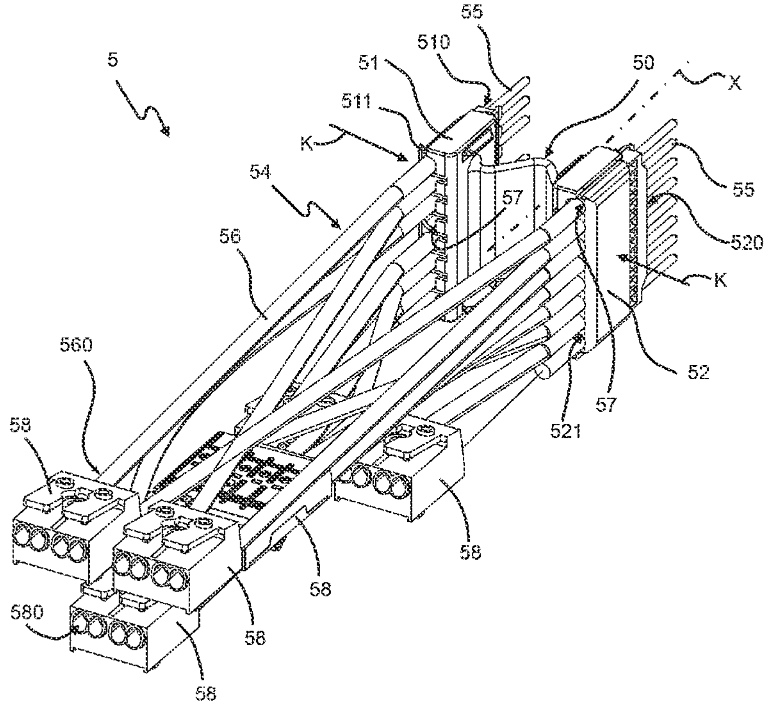
FIG. 6 is a perspective sectional view of the connection plug according to the invention according to FIG. 3.
Figure 7:
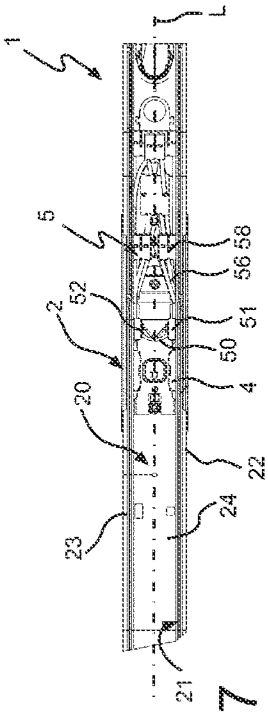
FIG. 7 is a schematic plan view of the luminaire mounting rail system according to the invention with installed connection plug according to FIG. 1 (in this case feed-in into the starting rail)

The first carrier 51 and the second carrier 52 are connected to one another via an intermediate spring element 50 in order to prestress the two carriers 51, 52 away from one another (i.e., thrusting the first and second carriers 51, 52 away from one another counter to the collapsing movement) during a collapsing movement K toward one another (i.e., a movement directed toward one another for bringing the first and second carriers 51, 52 closer together), as is shown by way of example in FIGS. 2, 4 and 6.

As is also shown by way of example in FIGS. 2, 4 and 6, the first carrier 51 and the second carrier 52 can be located opposite one another with respect to the spring element 50 or, in a planar manner, even face one another in a particularly preferred manner, as shown here.

As can be seen by way of example from all figures, the first carrier 51 and the second carrier 52 can be formed integrally with the spring element 50. Alternatively, however, it is also conceivable for the spring element 50 to be arranged as a separate component between the first carrier 51 and the second carrier 52. A combined integrated and separate embodiment of the spring element is also conceivable. The spring element 50 may preferably be designed as or comprise a compression spring.

As is not shown in the exemplary embodiments shown, the connection plug 1 may furthermore comprise at least one third carrier.

The first carrier 51 and the second carrier 52 (as shown) and, if present, also the third carrier can be integrally formed with one another.

The first carrier 51 and the second carrier 52 (as shown) and, if present, also the third carrier may be made of an insulating material, such as preferably of a plastics material. If the first carrier 51 and the second carrier 52, as described above, are preferably integrally formed with the spring element 50, the spring element 50 can also be produced accordingly from the insulating material. In principle, it is conceivable that, when a two-component injection molding process is used, the spring element 50 is made of a different material than the first and second carriers 51, 52 (and also the third carrier, if present), in order thus to provide the material corresponding to the functionality in an optimized manner.

The third carrier may be directly connected to the first carrier 51 or to the second carrier 52 or to the first and the second carrier 51, 52. The third carrier may be designed such that, when the first and second carriers 51, 52 are brought together in the collapsing movement K, said third carrier collapses in the direction of the collapsing movement K, so that the connection plug 5 can be reduced in its width by executing the collapsing movement K, so that it can be mounted or installed in a simple manner, as will be described below.

As shown in particular in FIG. 1 to 6, the connection plug 5 also comprises a plurality of contact elements 54. The contact elements 54 in turn comprise a plug connector element 55 for the electrical connection to an electrical conductor 30 of a busbar 3 of the luminaire mounting rail system 1 (see in particular FIGS. 2-4 and 6). Furthermore, the contact elements 54 each comprise a cable portion 56 which is electrically connected to the plug connector element 55 (see in particular FIG. 1 to 6).

As can be seen in particular from FIGS. 2 to 4 and 6, according to the embodiment shown, at least a portion of the plurality of contact elements 54 is carried by at least one of the carriers 51, 52. According to the exemplary embodiments shown here, the first carrier 51 and the second carrier 52 each carry a different portion of the plurality of contact elements 54. According to an alternative or supplementary embodiment, at least one (other) portion of the contact elements 54 may be carried by the third carrier (not shown here). It is thus possible that, depending on the embodiment of the connection plug 5, a different distribution of the contact elements 54 onto the carriers 51, 52 is conceivable. If the connection plug 5 comprises only the first carrier 51 and the second carrier 52, then, for example, either all contact elements 54 can be carried by the first carrier 51, or all contact elements 54 can be carried by the second carrier 52, or a portion of the contact elements 54 is carried by the first carrier 51 and the other portion of the contact elements 54 is carried by the second carrier 52. Such a distribution of the contact elements 54 is also conceivable if the connection plug 5 further comprises the at least one third carrier. If the connection plug 5 has the third carrier, it is thus conceivable that the third carrier, with a view to the above-described configurations, does not carry any of the contact elements 54. However, it is also conceivable that, with a view to the above-described configurations, the third carrier also carries a portion of the contact elements 54. In addition, it is also conceivable that the third carrier carries all contact elements 54 and none of the first carriers 51 and second carriers 52 carries a contact element 54.

The plug connector elements 55 all extend in parallel to the same longitudinal axis X away from one side 510, 520 of the carrier 51, 52 that carries them. With regard to the connection plug 5, the plug connector elements 55 thus all project to the same direction, as is shown by way of example in FIGS. 2 to 4 and 6.

If the connection plug 5 has the at least one third carrier, it may preferably be arranged laterally offset from the first carrier 51 and the second carrier 52 in a direction orthogonal to the longitudinal axis X and the collapsing movement K.

As shown here, the first carrier 51 and the second carrier 52 and, if present, also the third carrier can also be aligned in parallel to the longitudinal axis X.

Figure 3:
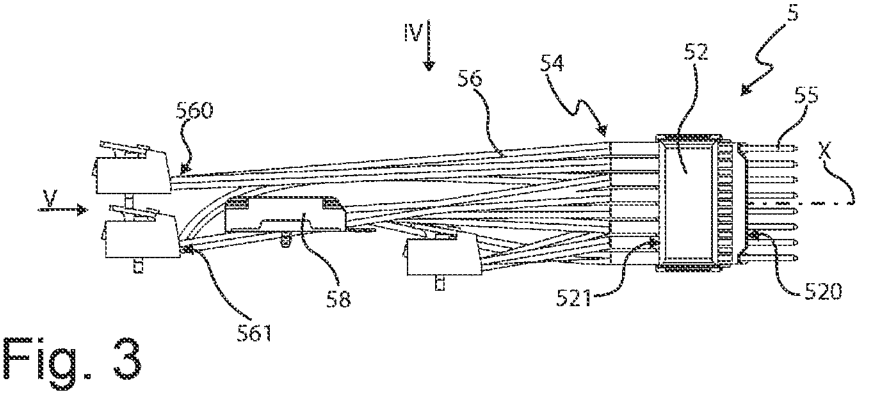
FIG. 3 is a side view of the connection plug according to the invention according to FIG. 1.

As shown in particular in FIGS. 2 to 4 and 6, the first carrier 51 and/or the second carrier 52 and, if present, also the third carrier can be designed to extend substantially in a corresponding extension plane E1, E2 (see FIG. 3). In this case, the extension planes E1, E2 of the first carrier 51 and the second carrier 52 may preferably be aligned in parallel to the longitudinal axis X, as is the case in the exemplary embodiments shown (see FIG. 3). Furthermore, the extension planes E1, E2 of the first carrier 51 and the second carrier 52 can be aligned in parallel to one another, as can also be seen from the exemplary embodiments shown (see FIG. 3). If the connection plug 5 furthermore has the third carrier, the extension plane E1 of the first carrier 51 and/or the extension plane E2 of the second carrier 52 may preferably also be aligned orthogonally to the extension plane of the third carrier.

As can be seen in particular from FIGS. 2 to 4 and 6, the plug connector elements 55 for each carrier 51, 52 can be arranged next to one another in a row; this is further the case preferably in the extension plane E1, E2 of the carriers 51, 52 associated therewith or, as shown here, in parallel to said extension plane.

As can be seen from FIGS. 2 to 4 and 6, the plug connector elements 55 can each be designed as a plug connector contact—in this case as a plug pin. Alternatively, however, it is also conceivable for each of the plug connector elements 55 to be designed as a plug receptacle.

As can be seen from the depicted FIGS. 2 to 4 and 6, the longitudinal axis X can be oriented orthogonally to the collapsing movement K.

As can also be seen in the exemplary embodiment, at least each of the carriers 51, 52 that carry the contact elements 54 may comprise one or more conductor receiving portions 57 running in parallel to the longitudinal axis X, in which conductor receiving portions in each case one of (as shown) the associated contact elements 54 or also a plurality thereof are partially accommodated in order to be carried by the corresponding carrier 51, 52.

As can be seen from FIGS. 1 to 4 and 6 to 9, the cable portions 56 all extend away from the carrier 51, 52 that carries them and toward a distal end 560 of each cable portion 56. The distal ends 560 each comprise an electrical connection portion 561 for the electrical connection to a further electrical conductor (not shown) for the electrical connection of the associated electrical conductor 30 to the corresponding further electrical conductor.

As can be seen from the figures, the cable portions 56 can all extend away from a further side 511, 521 of the corresponding carrier 51, 52. In this case, as shown here, the side 510, 520 and the further side 511, 521 are preferably opposite one another with respect to the associated carrier 51, 52.

Figure 1:
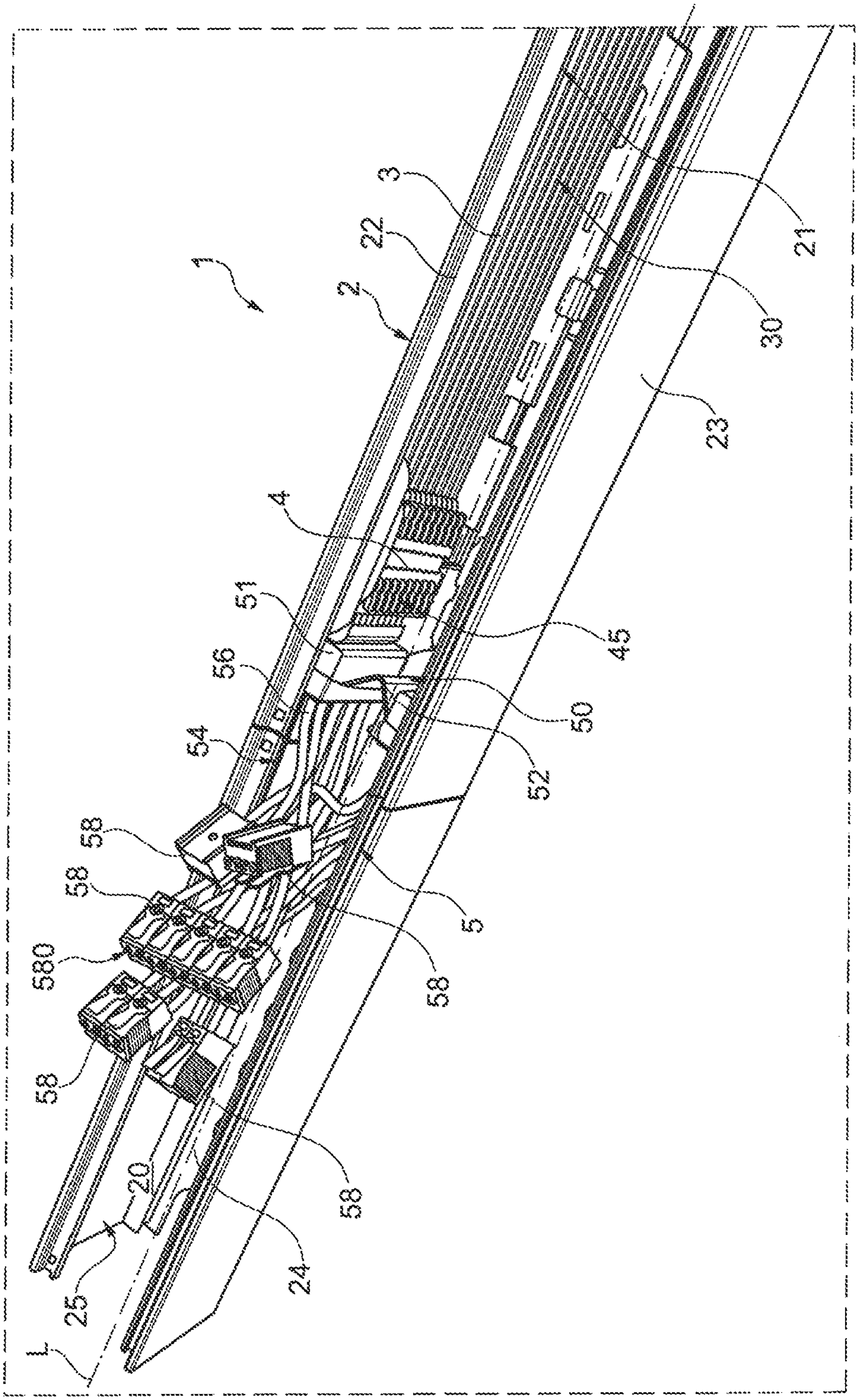
FIG. 1 is a perspective view of a portion of a luminaire mounting rail system according to the invention having a connection plug according to a first embodiment of the present invention.

As can be seen in particular from FIG. 1, the cable portions 56 may preferably in each case be designed to be bendable in order to move the connection portion 561 thereof relative to the associated carrier 51, 52 by bending the corresponding cable portion 56, so that said carrier, as shown here, can be ideally provided as an option and exposed to the outside for easy connection of the other electrical conductors when the connection plug 5 is provided in the luminaire mounting rail system 1.

As can also be seen from the figures, the contact elements 54 and preferably at least their cable portions 56 can each comprise an electrical conductor having an electrical conductor element. The electrical line can be a flexible electrical line or a rigid electrical line. The electrical conductor elements can each comprise one litz wire, preferably for forming a flexible electrical line. Alternatively, it is also conceivable that the electrical conductor elements each comprise a wire, preferably for forming a rigid electrical line.

The corresponding plug connector element 55 may preferably be electrically and mechanically connected to the electrical conductor element of the associated electrical line, this preferably being accomplished by means of crimping, soldering and/or pressing. As shown here, this connection region is preferably arranged in the conductor receiving portion 57.

According to an alternative embodiment, it is also conceivable for the corresponding plug connector element 55 to be integrally formed by an exposed end of one of the electrical conductor elements, preferably by ultrasound-compressed litz wires of the bundle or by the rigid wire.

As can be seen from the figures, the connection plug 5 may furthermore comprise at least one connection terminal 58 which is electrically and preferably also mechanically connected to at least one of the electrical connection portions 561. In the exemplary embodiments shown here, the connection plug 5 has a total of five connection terminals 58. As shown, the connection terminal 58 or at least one of the plurality thereof shown here can consequently preferably be connected to a plurality of the contact elements 54 via their electrical connection portions 561. The "overhung" connection terminals 58 can thus be combined, for example, to form defined cable groups.

The connection terminals 58 may comprise, depending on the connected electrical connection portion 561, an electrical contacting portion 580 electrically connected thereto for the electrical connection of the further electrical conductor.

The connection plug 5 is designed for an application in the luminaire mounting rail system 1. Such luminaire mounting rail systems 1 are shown by way of example in FIGS. 1 and 2 and 7 to 9.

In addition to the prescribed connection plug 5, the luminaire mounting rail system 1 also has an elongated profile rail element 2 with a longitudinal extension L which delimits an interior space 20 and has an elongated coupling opening 21. As shown in particular in FIGS. 1 and 7 to 9, the connection plug 5 can be inserted into the interior space 20 (here completely inserted) and preferably also be removed again.

As shown here, the profile rail element 2 may, for example, comprise two substantially parallel-aligned side wall legs 22, 23 which laterally delimit the coupling opening 21. The profile rail element 2 may preferably also comprise a transverse wall leg 24 connecting the side wall legs 22, 23, which transverse wall leg is preferably opposite the interior space 20 of the coupling opening 21.

As is also shown here, the profile rail element 2 may be designed here in multiple parts, in order here to create, for example, a sufficient storage space for the connection plug 5 subsequently provided here, for example, as an accessory part, provided that this storage space is not provided in any case in a profile rail element 2 designed in one piece, for example.

Figure 8:
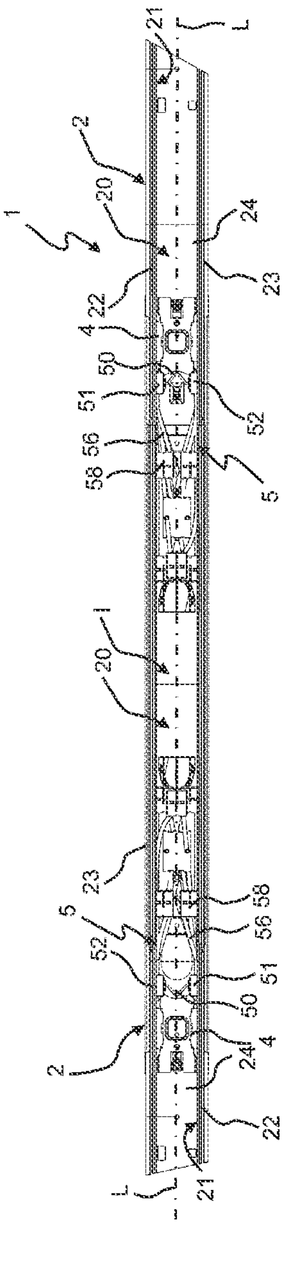
FIG. 8 is a schematic plan view of a luminaire mounting rail system according to the invention with installed connection plug according to a second embodiment of the present invention (here central feed-in)
Figure 9:
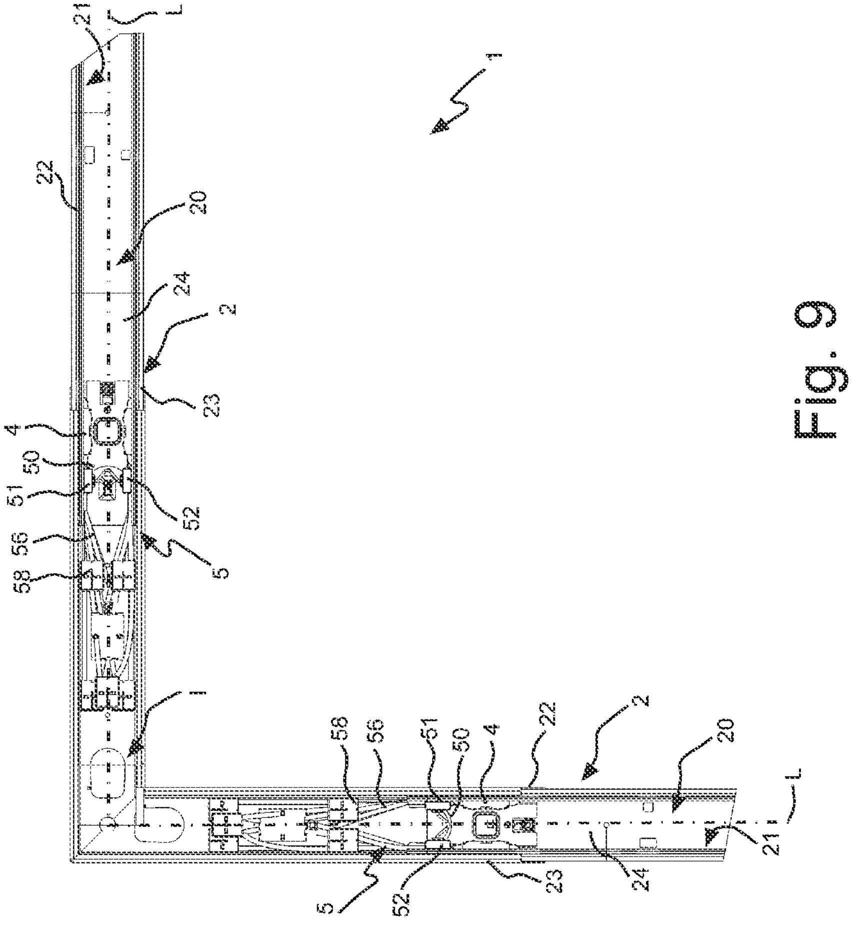
FIG. 9 is a schematic plan view of a luminaire mounting rail system according to the invention with installed connection plug according to a second embodiment of the present invention (in this case an L-feed-in).

The luminaire mounting rail system 1 may furthermore comprise a plurality of the profile rail elements 2, which are then particularly preferably connected to one another at the end face, so that their interior spaces 20 form a common system interior space I, as is shown by way of example in FIGS. 8 and 9.

The luminaire mounting rail system 1 furthermore comprises an elongated busbar 3 (in the exemplary embodiments shown, two busbars 3), which is/are arranged in the interior space 20 in a longitudinally extending manner. The busbar 3 in turn has the electrical conductors 30 extending longitudinally in parallel to one another for the electrical connection of electrical or electronic components via the described coupling opening 21.

The busbar 3 or, as shown here, the plurality of busbars 3 may in each case be arranged on an inner wall 25 of the profile rail element 2. In the embodiment shown in FIGS. 1 and 2, the busbars 3 are each arranged on one of the two opposing side wall legs 22, 23. However, it is also possible for the busbar(s) 3 to be arranged, additionally or alternatively, on the transverse wall leg 24.

The luminaire mounting rail system 1 also has a connection element 4 which is arranged in the interior space 20. The connection element 4 has a further plug connector element 45 for each electrical conductor 30, which plug connector element is electrically connected to the associated electrical conductor 30, as can be seen in FIGS. 1 and 2. As can also be seen in the exemplary embodiments shown, the luminaire mounting rail system 1 may comprise a plurality of the busbars 3 (in this case two) and a plurality of the connection elements 4. In this case, each of the connection elements 4 is preferably associated with exactly one of the busbars 3. Preferably, a busbar 3 has at least one of the connection elements 4 at least on one and preferably on both opposite end faces.

In the inserted state of the connection plug 5, the plug connector elements 55 of the connection plug 5 are each electrically contacted (see FIG. 1, 7-9) or can be contacted (see FIG. 2) with one of the further plug connector elements 45 by a plug-in movement along the longitudinal axis X. In the inserted state and/or in the electrically contacted state shown in FIG. 1, 7-9, the connection plug 5 is thrusted by means of the spring element 50 with its first and second carriers 51, 52 counter to the collapsing movement in the direction of or counter to the direction of the wall portions 26 of the profile rail element 2 that are opposite the coupling opening 21. In the exemplary embodiments shown here, the side wall legs 22, 23 each comprise one of the opposite wall portions 26, as shown, for example, in FIG. 2. If the connection plug 5 furthermore has the third carrier, it may preferably be arranged facing the transverse wall leg 24 and is particularly preferably located on the latter.

Each of the carriers 51, 52 may preferably, as shown here, be electrically contacted or contactable with its contact elements 54 with another one of the connection elements 4 via their plug connector elements 55 and further plug connector elements 45.

The luminaire mounting rail system 1 can be designed in such a way that at least two adjacent profile rail elements 2 of the plurality thereof each comprise at least one of the busbars 3 with connection elements 4 that face one another. In this case, for example, each of the connection elements 4 may be electrically contacted or contactable with one of the connection plugs 5 via their plug connector elements 55 and further plug connector elements 45. Preferably, the connection portions 561 of one of the connection plugs 5 may then be electrically contacted or contactable with the connection portions 561 of the other one of the connection plugs 5. This can particularly preferably take place via the connection terminals 58 thereof. In this way, the busbars 3 of the adjacent profile rail elements 2 may be electrically connected to one another in a simple manner. For this purpose, for example, the connection terminals 58 may be designed such that they can be plugged into one another in a simple manner, for example. It is also conceivable to provide corresponding wiring between the connection terminals 58. Other electrical connection options are also conceivable.

As already described, the plug connector elements 55 may each be designed as a plug connector contact (as shown) or as a plug receptacle. Accordingly, the further plug connector elements 45 may each be designed as a plug receptacle (as shown) or plug connector contact for electrical contacting corresponding to the plug connector elements 55 by means of a plug connection.

As is not shown in the figures, the luminaire mounting rail system 1 may furthermore comprise an electrical or electronic component. This then has a functional portion. The functional portion may, for example, comprise a luminaire, a sensor and/or a loudspeaker and the like. The electrical or electronic component furthermore has a connection portion electrically connected to the functional portion for the electrical connection to the busbar 3 or the busbars 3 via the coupling opening 21.

The present invention is not limited by the exemplary embodiments described above to the extent that it is covered by the subject matter of the following claims.

The invention claimed is:

1. A connection plug (5) for a luminaire mounting rail system (1), comprising:

a first carrier (51) and a second carrier (52), which are connected to one another via an intermediate spring element (50) in order to prestress the two carriers (51, 52) away from one another during a collapsing movement (K) toward one another, and a plurality of contact elements (54), wherein the contact elements (54) each comprise:

a plug connector element (55) for the electrical connection to an electrical conductor (30) of a busbar (3) of the luminaire mounting rail system (1), and a cable portion (56) which is electrically connected to the plug connector element (55), wherein at least a portion of the plurality of contact elements (54) is carried by at least one of the carriers (51, 52), wherein the plug connector elements (55) all extend in parallel to the same longitudinal axis (X) away from one side (510, 520) of the carrier (51, 52) that carries the contact elements (54), wherein the cable portions (56) all extend away from the carrier (51, 52) that carries the contact element (54) and toward a distal end (560) of the corresponding cable portion (56), wherein the distal ends (560) each comprise an electrical connection portion (561) for the electrical connection to a further electrical conductor for the electrical connection of the associated electrical conductor (30) to the corresponding further electrical conductor;

wherein the collapsing movement (K) is orthogonal to the longitudinal axis (X); and wherein the first carrier (51) and the second carrier (52) are formed extending substantially in plate form in a corresponding extension plane (E1, E2), the extension planes (E1, E2) of the first carrier (51) and the second carrier (52) are aligned in parallel to the longitudinal axis (X), and the extension planes (E1, E2) of the first carrier (51) and the second carrier (52) are aligned in parallel to one another.

2. The connection plug (5) according to claim 1, wherein another portion of the plurality of contact elements (54) is carried at least by the first carrier (51) or the second carrier (52).

3. The connection plug (5) according to claim 1, wherein the first carrier (51) and the second carrier (52) each carry a different portion of the plurality of contact elements (54).

4. The connection plug (5) according to claim 1, wherein the first carrier (51) and the second carrier (52) are integrally formed with one another, and wherein the first carrier (51) and the second carrier (52) are made of an insulating material.

5. The connection plug (5) according to claim 1, wherein the plug connector elements (55) for each carrier (51, 52) are arranged next to one another in a row, in or in parallel to the corresponding extension plane (E1, E2) of the carrier (51, 52) associated therewith.

6. The connection plug (5) according to claim 1, wherein the plug connector elements (55) are each designed as a plug connector contact or as a plug receptacle.

7. The connection plug (5) according to claim 1, wherein the first carrier (51) and the second carrier (52) are located opposite one another with respect to the spring element (50), and face one another in a planar manner.

8. The connection plug (5) according to claim 1, wherein the first carrier (51) and the second carrier (52) are formed integrally with the spring element (50), and/or wherein the spring element (50) is a compression spring and is arranged as a separate component between the first carrier (51) and the second carrier (52).

9. The connection plug (5) according to claim 1, wherein at least each of the carriers (51, 52) carrying the contact elements (54) has one or more conductor receiving portions (57) running in parallel to the longitudinal axis (X) and into which one or more of the associated contact elements (54) are partially accommodated in order to be carried by the corresponding carrier (51, 52).

10. The connection plug (5) according to claim 1, wherein the cable portions (56) all extend away from a further side (511, 521) of the corresponding carrier (51, 52), wherein the side (510, 520) and the further side (511, 521) are opposite one another with respect to the associated carrier (51, 52).

11. The connection plug (5) according to claim 1, wherein each of the cable portions (56) is designed to be bendable in order to move the connection portion (561) thereof relative to the associated carrier (51, 52) by bending the corresponding cable portion (56).

12. The connection plug (5) according to claim 1, wherein the contact elements (54) and their cable portions (56) each comprise an electrical conductor having an electrical conductor element comprising a flexible electrical line or a rigid electrical line.

13. The connection plug (5) according to claim 12, wherein the electrical conductor elements each comprise:

one litz wire forming a flexible electrical line, or a wire forming a rigid electrical line.

14. The connection plug (5) according to claim 12, wherein the corresponding plug connector element (55) is electrically and mechanically connected to the electrical conductor element of the associated electrical line, by means of crimping, soldering and/or pressing.

15. The connection plug (5) according to claim 12, wherein the corresponding plug connector element (55) is integrally formed by an exposed end of one of the electrical conductor elements, by ultrasound-compressed litz wires of the bundle or by the rigid wire.

16. The connection plug (5) according to claim 1, further comprising at least one connection terminal (58) which is electrically and also mechanically connected to at least one of the electrical connection portions (561), wherein the connection terminal (58) for each connected electrical connection portion (561) has an electrical contacting portion (580) electrically connected thereto for the electrical connection of the further electrical conductor.

17. The connection plug (5) according to claim 16, wherein the connection terminal (58) or at least one of a plurality thereof is connected to a plurality of the contact elements (54) via their electrical connection portions (561).

18. A luminaire mounting rail system (1), comprising:

an elongated profile rail element (2) having a longitudinal extension (L), which element delimits an interior space (20) and has an elongated coupling opening (21), an elongated busbar (3) which is arranged extending longitudinally within the interior space (20), wherein the busbar (3) has electrical conductors (30) extending longitudinally in parallel to one another for the electrical connection of electrical or electronic components via the coupling opening (21), a connection element (4) which is arranged in the interior space (20), wherein the connection element (4) has a further plug connector element (45) for each electrical conductor (30), which further plug connector element is electrically connected to the associated electrical conductor (30), and a connection plug (5) according to claim 1 which can be inserted into the interior space (20), wherein, in the state inserted in this way, the plug connector elements (55) can each be electrically contacted with one of the further plug connector elements (45) by a plug-in movement along the longitudinal axis (X), and wherein the connection plug (5), in the state inserted and/or electrically contacted in this way, pushes with its first and second carriers (51, 52) by means of the spring element (50) counter to the collapsing movement (K) in the direction of or counter to the direction of the wall portions (26) of the profile rail element (2) that are opposite the coupling opening (21).

19. The luminaire mounting rail system (1) according to claim 18, wherein the profile rail element (2) has two substantially parallel-aligned side wall legs (22, 23) which laterally delimit the coupling opening (21), wherein the side wall legs (22, 23) each comprise one of the opposing wall portions (26).

20. The luminaire mounting rail system (1) according to claim 19, wherein the profile rail element (2) further has a transverse wall leg (24) connecting the side wall legs (22, 23), which transverse wall leg is preferably opposite the interior space (20) of the coupling opening (21).

21. The luminaire mounting rail system (1) according to claim 18, further comprising a plurality of the busbars (3) and a plurality of the connection elements (4), wherein each of the connection elements (4) is associated with precisely one of the busbars (3), and wherein each of the carriers (51, 52) can be electrically contacted with its contact elements (54) to another one of the connection elements (4) via their plug connector elements (55) and further plug connector elements (45).

22. The luminaire mounting rail system (1) according to claim 18, wherein the busbar (3) or, if present, the plurality of busbars (3) are each arranged on an inner wall (25) of the profile rail element (2).

23. The luminaire mounting rail system (1) according to claim 18, further comprising a plurality of the elongated profile rail elements (2) which are connected to one another at the end sides, so that their interior spaces (20) form a common system interior space (I).

24. The luminaire mounting rail system (1) according to claim 23, wherein, of the plurality of profile rail elements (2), at least two adjacent ones each comprise at least one of the busbars (3) with connection elements (4) that face one another, wherein each of the connection elements (4) can be electrically contacted with one of the connection plugs (5) via their plug connector elements (55) and further plug connector elements (45), and wherein the connection portions (561) of one of the connection plugs (5) may be electrically contacted with the connection portions (561) of the other one of the connection plugs (5), via their connection terminals (58), in order to electrically connect the busbars (3) of the adjacent profile rail elements (2) to one another.

25. The luminaire mounting rail system (1) according to claim 18, wherein the plug connector elements (55) are each designed as a plug connector contact or as a plug receptacle, and wherein the further plug connector elements (45) are each designed for electrical contacting as a plug receptacle or plug connector contact corresponding to the plug connector elements (55) by means of a plug connection.

26. The luminaire mounting rail system (1) according to claim 18, further comprising an electrical or electronic component, comprising:

a functional portion, and a connection portion electrically connected to the functional portion for the electrical connection to the busbar (3) via the coupling opening (21).

27. The luminaire mounting rail system (1) according to claim 18, wherein the functional portion has a luminaire, a sensor, and/or a loudspeaker.

28. A kit comprising the connection plug (5) of claim 1 and a connection element (4) having plug connector elements (45) for each electrical conductor (30) in the respective busbar (3), wherein each plug connector element (45) is adapted to receive one of the plug connector elements (55) on the connection plug (5) to make respective electrical connections between the cables (56) and the electrical conductors (30) of the respective busbar (3) in the rail (1).

* * * * *